Patented July 6, 1926.

1,591,430

UNITED STATES PATENT OFFICE.

WILLIAM D. MOREHOUSE, OF PORTLAND, OREGON.

METHOD OF TREATING FRUIT-BEARING TREES AND PLANTS.

No Drawing.   Application filed December 8, 1922.   Serial No. 605,702.

My invention relates to a method of treating fruit bearing trees or shrubs.

Nature has devised a system of circulation in the fruit bearing trees, which forces the sap from the root system through the cambium layer, thus supplying sustenance and life to the tree. When this flow of sap is retarded, to any considerable extent, it evidences itself in rough and uneven protrusions in the bark. These protrusions are caused by the pent up or retarded sap within the cambium layer. It frequently happens that the bark below the crotch, becomes seamed with innumerable fissures, through which the sap flows or escapes, and eventually, cankerous spots, and subsequently, festering sores appear. The tips of the branches of the tree become tardy in producing leaves, and the fruit decreases, in number, as well as quality and commercial value, and the very life of the tree is endangered.

Some attempts have heretofore been made to overcome these difficulties caused by the retarding or stopping of the flow of sap in the cambium layer, which is caused to a considerable extent by the binding action of the bark upon such layer. The Department of Agriculture, as early as 1903, attempted a solution of this problem. The attempt consisted in cutting or wounding the bark sufficiently to allow of expansion in its tissue. The bark or outer shell reaching from the ground to the crotch was slit longitudinally. However, as soon as this incision healed, it frequently occurred that another had to be made, with the result that the vitality of the tree was greatly taxed, and the crop seriously injured.

In accordance with my method, I propose to loosen the bark about the cambium layer, to permit of the proper circulation of the sap through the cambium layer, by a massaging treatment to the bark, without slitting or cutting the same. This massaging treatment consists in striking upon the bark of the tree, blows of suitable force, without breaking or bruising said bark. In carrying out this treatment, I preferably employ a stick about three feet long, and suitably stout, so that a considerable blow may be given to the tree, by the operator holding the stick in the hand. The forward end of the stick which is to impinge against the tree is covered with some shock absorbing material, such as cloth, preferably three layers of the cloth, which is also adapted to absorb a liquid, which is worked into the bark of the tree, during the massaging treatment.

The solution which I employ consists of phosphoric acid, water soluble potash obtained from the ashes of trees, and water. I preferably employ one part by weight of phosphoric acid, one part by weight of potash and seven and one-half parts by weight of water. These ingredients are thoroughly mixed forming a solution. The absorbent element carried by the stick is dipped into the solution, and as the bark of the tree is struck with the shock absorbing element, the solution is beaten into the bark of the tree. The striking of the bark of the tree causes it to be depressed, but when the blow is over, the bark springs out, and it is this action or movement of the bark, which loosens it from the cambium layer, and relieves the pressure upon the same. The beating or massaging the bark serves to thoroughly cleanse the bark and all incisions or abrasions and the solution passes through these and all other available openings in the bark, and finds its way to the cambium layer. This solution is taken up by the sap of the tree and passes through the cambium layer to the leaves, where it is converted into the tree tissue.

It is preferred that this treatment be given to the tree early in March, followed by a second treatment three or four weeks later.

I have also found that bacterial gummosis and all incessant bleedings of fruit trees, such as cherry trees, may be partly or wholly overcome and permanently healed by treatment with my solution. In cases of gummosis, all diseased parts of the bark are cut out with the gum secretion, by means of a sharp chisel and mallet. The tree then has its bark massaged, by the beater, with the solution carried by the absorbent element. The portions of the bark which are thus cut out are also massaged and the solution quickly heals the wounded parts. As a result of this the pruning of the cherry tree, as well as other fruit trees, may be followed with beneficial results.

It is recognized that the thorough pruning and spraying of fruit trees, now practiced, is of great advantage. However, my solution, if applied as above indicated, has marked advantages. The solution innervates the cambium layer, and invigorates the tree. By invigorating the tree the falling of the fruit is prevented to a considerable extent. The solution also thoroughly cleanses the body and limbs of the tree, removing fungus and vermin, leaving the bark tender, pliable and expansible. The yield in fruit from the tree has been found to increase materially. The fruit is found to be of a crisp, live texture, larger in size, having an almost transparent skin, which partakes of a most decided coloring. It is found that a few days after treating the tree, as I have above indicated, a bright green tinge will be imparted to the outer surface of the bark of the tree, and all shell bark will have loosened and fallen off, leaving the bark generally smooth. Special attention must be paid, in massaging, to the irregular or discolored surface of the bark, and all uneven surfaces must be thoroughly massaged, to bring them in accord with the rest of the bark.

I have found that apple trees four years from planting, are brought into vigorous production, when treated as above mentioned.

It is to be understood that the form of my invention, herewith described, is to be taken as a preferred example of the same, and various changes may be made in the order of the steps of the method, and that chemical equivalents may be employed, without departing from the spirit of my invention or the scope of the subjoined claims.

Having thus described my invention, I claim:

1. The hereindescribed method of treating fruit bearing trees or the like for increasing their growth and yield, which consists in massaging the bark of the tree to loosen the same.

2. The hereindescribed method of treating fruit bearing trees or the like for increasing their growth and yield, which consists in massaging the bark of the tree by subjecting the same to the action of blows over substantially the entire area thereof, such blows serving to loosen the bark upon the cambium layer.

3. The hereindescribed method of treating fruit bearing trees or the like for increasing their growth and yield, which consists in massaging the bark of the tree by subjecting the same to the action of blows, in the presence of a solution adapted to serve as nutrition for the tree, such solution penetrating the bark and passing to the cambium layer.

4. The hereindescribed method of treating fruit bearing trees or the like for improving their growth and yield, which consists in beating a nutritious solution into the bark of the tree and causing the same to pass through the bark to the cambium layer.

In testimony whereof I affix my signature.

WILLIAM D. MOREHOUSE.